United States Patent [19]

Fowler

[11] Patent Number: 4,471,534

[45] Date of Patent: Sep. 18, 1984

[54] REMOTE READING COMPASS WITH 360 DEGREE ROLL CAPABILITY

[75] Inventor: John T. Fowler, Marblehead, Mass.

[73] Assignee: The Laitram Corporation, New Orleans, La.

[21] Appl. No.: 444,075

[22] Filed: Nov. 24, 1982

[51] Int. Cl.³ .................... G01C 17/18; G01C 17/26
[52] U.S. Cl. .................................... 33/363 N; 33/346;
33/352; 33/355 R; 33/364; 33/366
[58] Field of Search ............... 33/346, 363 R, 363 N,
33/364, 366, 355 R, 345, 344, 354, 352, 351, 363
K, 363 Q

[56] References Cited

U.S. PATENT DOCUMENTS

| 1,589,039 | 6/1926 | Anschutz-Kaempfe . | |
|---|---|---|---|
| 2,067,441 | 1/1937 | Freeman | 33/363 N |
| 3,206,863 | 9/1965 | Hatch | 33/363 N |
| 3,262,080 | 7/1966 | Hubbard | 33/363 N X |
| 3,373,617 | 3/1968 | Lassig . | |
| 4,027,398 | 6/1977 | Fowler | 33/346 |

Primary Examiner—William D. Martin, Jr.
Attorney, Agent, or Firm—Gagnebin & Hayes Weingarten, Schurgin

[57] ABSTRACT

A cylindrical compass gimballing and data readout system permitting 360° rotation about both yaw and roll axes includes a cylindrical compass housing flooded with semiconductive fluid to permit transmission of a digitally multiplexed signal from a remote reading compass to a processing unit in which the fluid is interposed between spaced-apart plates located along and perpendicular to the roll axis of the compass. This permits electrical connection to and from the compass, and permits not only 360° rotation about the yaw axis for compass heading readout, but also 360° rotation of the compass about the roll axis to permit use in seismic streamers.

10 Claims, 3 Drawing Figures

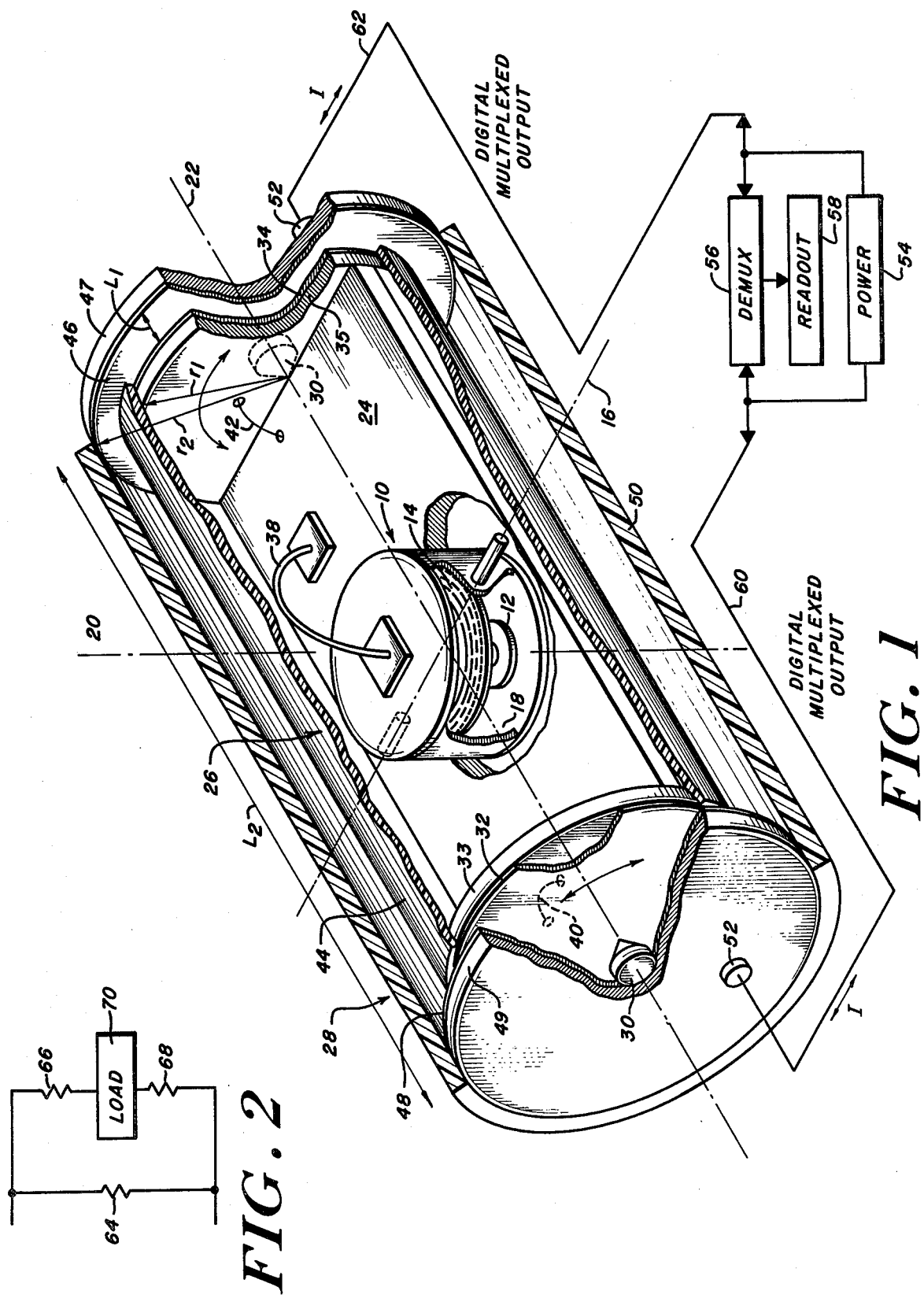

REMOTE READING COMPASS WITH 360 DEGREE ROLL CAPABILITY

FIELD OF INVENTION

This invention relates to remote reading compasses, and more particularly to compass configurations which permit continuous 360° rotation about the roll axis.

BACKGROUND OF THE INVENTION

As discussed in U.S. Pat. No. 4,027,398, issued to John T. Fowler, et al. on June 7, 1977 and incorporated herein by reference, there is often a need for a remote reading magnetic compass providing an electrical output signal representing compass heading. A particularly effective digital compass is a subject of U.S. Pat. No. 3,888,016, wherein a compass disk contains a plurality of optically coded tracks which are photoelectrically sensed to provide a digital output signal representative of compass heading. The coded disk is supported for rotation about a normally vertical axis by upper and lower pivot bearings which also maintain optical alignment of the photoelectrically sensed disk with respect to the associated sensor. The compass is mounted within a gimball assembly to maintain a horizontal disk orientation and minimize spurious motion of the disk.

While connections to such a compass may be made by electrical leads, it will be appreciated that the compass is prevented by stops from continuously rotating 360° about the roll axis to prevent breakage of the leads from the outer compass housing to the compass. In the past, slip rings or the like have been utilized to permit 360° rotation about the roll axis, but slip ring embodiments are subject to wear and provide an inordinately high spurious signal content for signals transmitted through the slip ring interface.

As exemplified in U.S. Pat. No. 4,047,168, there have also been attempts to transmit signals through the two single point contacts afforded by conductive jewel gimballing along the roll axis. This type of connection interface, while effective at low data rates, is somewhat unreliable at high data rates. The reason is contact bounce which, while not a factor at low 500 Hz data rates, results in lost data at the 20 KHz data rates associated with the above-mentioned remote reading compass. Thus, the reliability of both slip ring and single point contact connection systems is not optimal for high data rate systems.

360° rotation is important when remote reading compasses are supplied in seismic streamers in which the streamer line twists and rotates about the roll axis as it it towed. If 360° roll freedom cannot be provided, the compasses provide false readings when the vertical axis of yaw cannot be maintained. It should be noted that remote reading compasses using spring-loaded conductive pivots and a single cylindrical housing to permit mounting in streamers are available as Digicourse models 318, 319, 320, and 321. Models 225, 226, and 227 utilize a single cylindrical housing with hard-wired connections.

By way of further background, it is noted that the early Anschultz gyroscopes, as exemplified by U.S. Pat. Nos. 1,589,039 and 3,373,617 were provided with a semiconductive fluid between an inner gyro structure and an outer casing. All of these gyros were spherical in design and while 360° rotation was permitted around the yaw axis, rotation about the roll axis was strictly limited. Electrical power was applied to the outer shell at the north and south poles. The electrical power was transmitted through the semiconductor fluid to a phase splitting circuit which provided three phase power for the gyroscope. At that time, the orientation of the gyroscopic device was readout through the use of electrically conductive stripes on the inner and outer shells through a null circuit. It will be appreciated that losses between electrodes on a spherical surface through the semiconductive fluid are large due to the spherical geometry, especially with small miniature spheres. Devices using these small spheres draw considerable amounts of current due to the closeness of the spacing of the electrodes on the sphere and the associated extremely short conduction paths over the surface of the sphere. Small spheres are important to the miniaturization of digital compasses, but their use has heretofore been limited because of the difficulty of coupling signals into and out of the compass and because using a conductive fluid interface poses the problems of large losses and current drain.

In summary, the requirement for unrestricted 360° rotation of the inner portion of the compass about the roll axis presents unusual difficulties in the transmission of such large amounts of information without the use of hard wiring. Since these compasses may be remotely located and are therefore relatively inaccessible, reliability is of paramount importance so that reliable jitter-free digital outputs of compass heading may be obtained.

SUMMARY OF THE INVENTION

In order to provide a miniaturized remote reading 360° yaw and roll compass having reliable readout of compass heading without the utilization of a hard wired system, a cylindrical gimballing and readout system is provided. In one embodiment, an outer cylinder is completely filled with semiconductive fluid. The outer cylinder carries a coaxially located inner cylinder to which is mounted a remote reading compass. A semiconductive fluid is interposed between two spaced-apart plates or electrodes carried at the ends of the inner and outer cylinders, with the electrodes being positioned along and perpendicular to the roll axis at either end of the cylinders. Electrical contact to and from the compass is provided across the plates and interposed semiconductive fluid, with the large area of the plates providing reliable electrical connection for the readout of the compass. The cylindrical configuration is important because it provides sufficient electrode spacing to restrict leakage from one electrode to the other through the semiconductive fluid along the long axis of the cylinders. The specific cylindrical geometric configuration thus permits miniaturization without excessive leakage and consequent current drain by providing an elongated longitudinal leakage path.

More specifically, in one embodiment, a compass card and multiplexing readout circuitry are mounted within a cylindrical inner housing and are limitedly gimballed about the pitch axis to a circuit board carried in the cylindrical inner housing to in part maintain a vertical compass orientation. In order to provide for the other part of the vertical compass orientation, the cylindrical inner housing is gimballed to a fixed or "strapped down" coaxially located cylindrical outer housing for 360° rotation about the roll axis for the device. The cylindrical inner housing has end plates at either end which are electrically conductive, the major portion of the cylindrical inner housing being electrically non-conductive. The outer housing has electrically conductive end plates parallel to the end plates of the cylindrical inner housing. Again, the cylindrical outer housing is of a non-conductive material. Electrical leads are applied to the end plates for the cylindrical outer housing and electrical contact is established between the plates by completely filling of the cylindrical outer housing with a semiconductive fluid. Depending on the radii of the cylindrical inner and outer housings, the length of the cylindrical outer housing and the spacing between adjacent plates, it is possible to achieve a 99.97% transmission to the load within the cylindrical inner housing, the load being the remote reading compass processing circuitry.

The current loss associated with the application of power through the semiconductive fluid from one end of the cylindrical outer housing to the other may be minimized by increasing the ohms per square of the semiconductive fluid. Thus, while the same transmission percentage can be achieved with a fluid having an ohms per square of one ohm, scaling the fluid ohms per square characteristic to 100 ohms reduces the power loss by a factor of 100.

What is provided by the utilization of the semiconductive fluid is a reliable connection between the digital compass and its surrounding casing, without the utilization of a hard wired system and without the utilization of point contact gimballing connectors.

The semiconductive fluid is chosen with an ohms per square as high as possible, which has a minimum degredation over time, and which also provides an appropriate damping rate for the inner housing, while at the same time not severely limiting the free rotation of the inner housing.

It is a finding of this invention that a semiconductive fluid can in fact be utilized in the above geometric configuration for the transmission of relatively low level complex multiplexed signals, without significant loss of informational content and without significant power losses. Moreover, the use of the semiconductive fluid for the transmission of multiplex signals permits subminiature high data rate low power components to be fabricated.

BRIEF DESCRIPTION OF THE DRAWINGS

These and other features of the subject invention will be better understood in connection with the detailed description taken in conjunction with the drawings of which:

FIG. 1 is a cut-away and isometric view of one embodiment of the subject compass illustrating coaxially carried cylindrical inner and outer housings connected through the utilization of a semiconductive fluid;

FIG. 2 is a schematic diagram of an equivalent electric circuit for a portion of the compass of FIG. 1.

DETAILED DESCRIPTION

Figure 3:
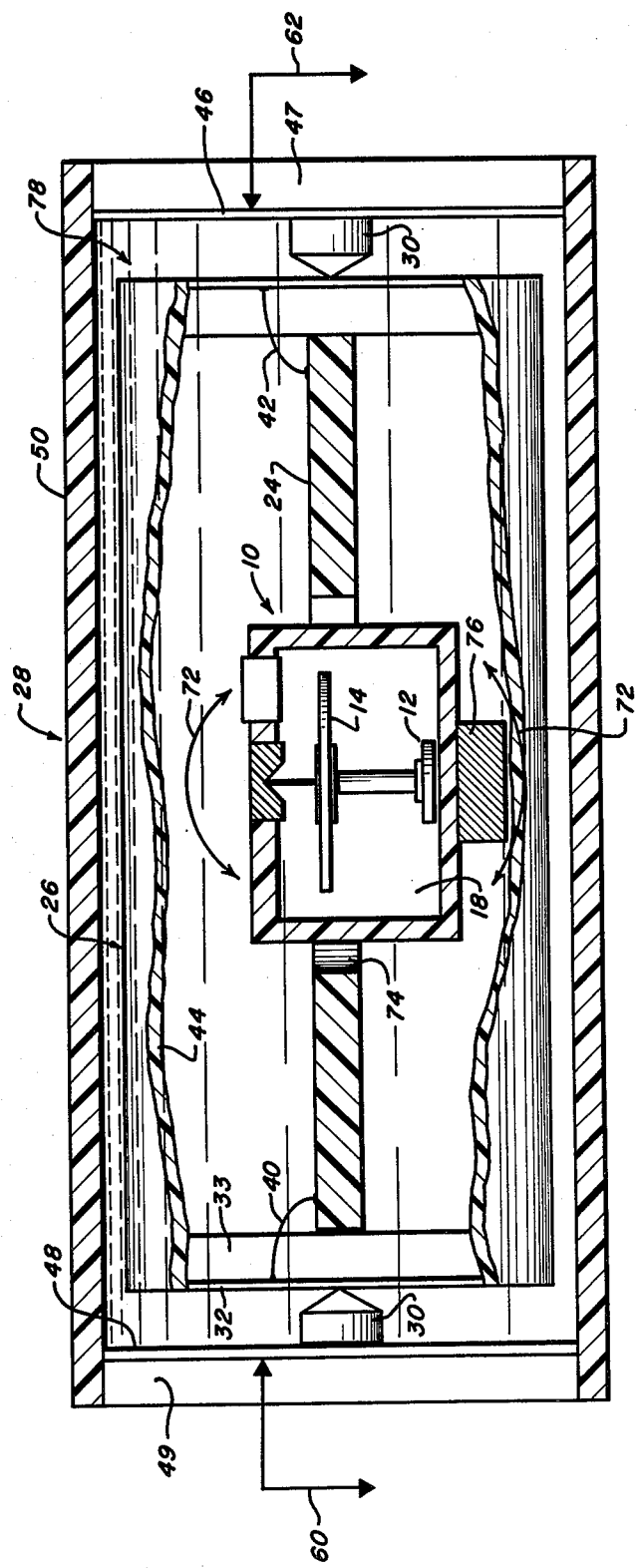
FIG. 3 is a cross-sectional and partial side view of the compass of FIG. 1.

Referring now to FIG. 1, a remote reading compass 10 with a magnetic element 12 and a compass card 14 is gimballed limitedly along a pitch axis 16, with card 14 and suspended apparatus being floated within housing 18 such that card 14 is free to revolve 360° about yaw axis 20. Compass 10 is in effect gimballed for 360° rotation about roll axis 22 by virtue of its gimballing to a circuit board 24 mounted within a cylindrical inner housing 26 gimballed to a cylindrical outer housing 28 by gimball jewels 30 lying on roll axis 22.

Cylindrical inner housing 26 is provided with electrodes 32 and 34 respectively on support disks 33 and 35 at either end of circuit board 24. Remote reading compass 10 of the type described hereinbefore in U.S. Pat. No. 3,888,016, is connected via cable 38 and lines 40 and 42 to respective electrodes 32 and 34. Between the supports 33 and 35 is an electrically non-conductive cylindrical skin 44 which completes the cylindrical inner housing.

The cylindrical outer housing includes electrodes 46 and 48 centered on roll axis 22 and parallel to electrodes 32 and 34 such that all electrodes are perpendicular to and along the roll axis. These electrodes are mounted to support disks 47 and 49 respectively. The cylindrical outer housing is also electrically non-conductive as indicated at 50.

Electrical contact both for power and for demodulation of the signals from compass 10 is provided at 52 such that power from a power supply 54 may be supplied to compass 10 and such that digital signals from compass 10 may be demultiplexed at 56 and read out by an appropriate unit 58.

In order to establish an electrical connection between lines 60 and 62 and compass 10, the region between the cylindrical inner housing and the cylindrical outer housing is filled with a semiconductive fluid. This fluid may be sea water or in general, any semiconductive fluid having an appropriate ohms per square characteristic.

It will be appreciated that the data rate may be on the order of 20 KHz and that it is a finding of this invention that such a high data rate may in fact be read out from compass 10 through the interface comprising the spaced-apart electrodes and the semiconductive fluid contained therebetween. As an example, assuming that the radius of electrodes 32 and 34, $r_1$, equals 0.98", assuming the radius of electrodes 46 and 48, $r_2$, equals 1.0", assuming that the length $L_1$ between adjacent electrodes is 0.02", and further assuming that the length of the cylindrical outer housing between electrodes 46 and 48 is 4", it can be demonstrated that with a fluid having an ohms per square characteristic of 1 ohm, the resistor values of the equivalent circuit of FIG. 2 are as illustrated, e.g. 40 ohms for resistor 64 and 0.0066 ohms for resistors 66 and 68, with load 70 being the load presented by the remote reading compass 10. Note that the resistance between electrodes through any kind of fluid is given by the following formula: $R = L/A$ (ohms/square), with the resistance value for resistor 40 being given by the formula $R = L_2/A = L_2/(\pi r_2^2 - \pi r_1^2)$ and with the resistance between adjacent electrodes being given $R = L_1/A$.

The transmission percentage for the above case can be calculated to be 99.97% which represents an extremely high coupling factor to the digital compass permitting the high data rate to be read out.

While a semiconductive fluid with a one ohm characteristic provides for the 99.97% transmission characteristic, it will be appreciated that power losses can be reduced by two orders of magnitude by scaling the fluid to have an ohms per square characteristic of one hundred ohms. This results in resistor 64 having a 4,000 ohm value whereas resistors 66 and 68 have a 0.6 ohm characteristic. As can be seen, the transmission percentage is the same with the power loss being proportional to the ohms per square characteristics of the semiconductive fluid.

Referring to FIG. 3, a side and cut-away view of the cylindrical embodiment of the subject compass is illustrated in which like members are provided with like reference characters. In this figure it will be noted that the compass is limitedly gimballed about the pitch axis as illustrated by arrows 72, with stops being provided by aperture 74 in circuit board 24.

Compass 10 is provided with a weight or mass 76 at the bottom of the compass housing to provide a righting moment so that compass card 14 rotates about a vertically oriented yaw axis.

It will also be noted that in this figure, the region between the cylindrical inner and outer housings is filled with a semiconductive fluid 78 to provide the electrical connection between the adjacent electrodes regardless of the rotational angle of the inner housing with respect to the outer housing.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A compass comprising:
an outer electrically non-conductive housing having yaw, pitch and roll axes and carrying spaced-apart electrode plates, at least a portion of an electrode plate being perpendicular to said roll axis;
an inner electrically non-conductive housing mounted within said outer housing for 360° rotation about the roll axis of said outer housing, said inner housing being mounted in said outer housing between said spaced-apart electrodes, said inner housing carrying electrode plates, each spaced from and oriented parallel to an associated electrode carried by said outer housing;
a digital compass mounted in said inner housing, said digital compass having a digital multiplexed output and a magnetic field sensing element mounted for rotation about said yaw axis;
means for coupling said digital compass to the electrode plates of said inner housing; and
a semiconductive fluid between associated electrodes of said inner and outer housings, whereby power may be supplied to said digital compass via connection to the electrode plates carried by said outer housing and whereby digital data from said digital compass may be readout via connection to the electrode plates carried by said outer housing.

2. The compass of claim 1 wherein said inner and outer housings are cylindrical.

3. The compass of claim 1 wherein said inner and outer housings are cylindrical, wherein the electrode plates carried by said outer housing are flat disks at either end of said outer housing, and wherein the electrodes carried by said inner housing are flat disks located at either end of said inner housing.

4. The compass of claim 3 wherein said inner housing includes means for gimballing said inner housing to said outer housing along said roll axis.

5. The compass of claim 4 wherein said gimballing means includes point pivots carried on the flat disks associated with said outer housing, and wherein the points of said pivots are adapted to contact the flat disks associated with said inner housing.

6. The compass of claim 5 wherein said point pivots are electrically non-conductive.

7. The compass of claim 5 wherein said point pivots are located along said roll axis.

8. The compass of claim 3 wherein said inner housing includes a circuit board between the flat disks associated with said inner housing, said digital compass including a housing and means for mounting said digital compass housing to said printed circuit board such that said digital compass is free to limitedly rotate about said pitch axis.

9. The compass of claim 8 wherein said circuit board has an orifice therethrough, wherein said digital compass housing is mounted in said orifice, and further including means including pivot pins coupled between said digital compass housing and said circuit board for permitting said limited rotation about said pitch axis.

10. The compass of claim 1 and further including means for supplying power to the spaced-apart electrode plates associated with said outer housing, and means coupled to the spaced-apart electrode plates associated with said outer housing for demultiplexing the digital multiplexed output of said digital compass.

* * * * *